J. Wyberd,

Reflector.

No. 982. Reissued June 12, 1860.

Witnesses.

Thomas Ward

Richard R. Sawyer

Inventor.

J. Wyberd

UNITED STATES PATENT OFFICE.

JOHN WYBERD, OF NEW YORK, N. Y.

IMPROVED NIGHT LIGHT-REFLECTOR.

Specification forming part of Letters Patent No. 27,855, dated April 10, 1860; Reissue No. 982, dated June 12, 1860.

*To all whom it may concern:*

Be it known that I, JOHN WYBERD, of the city, county, and State of New York, have invented a new and useful Improvement in Night Light-Reflectors; and I do hereby declare that the following is a full, clear, and exact description of the same, reference being had to the annexed drawings, forming part of this specification, in the several figures of which similar characters of reference denote the same part.

Figure 1:
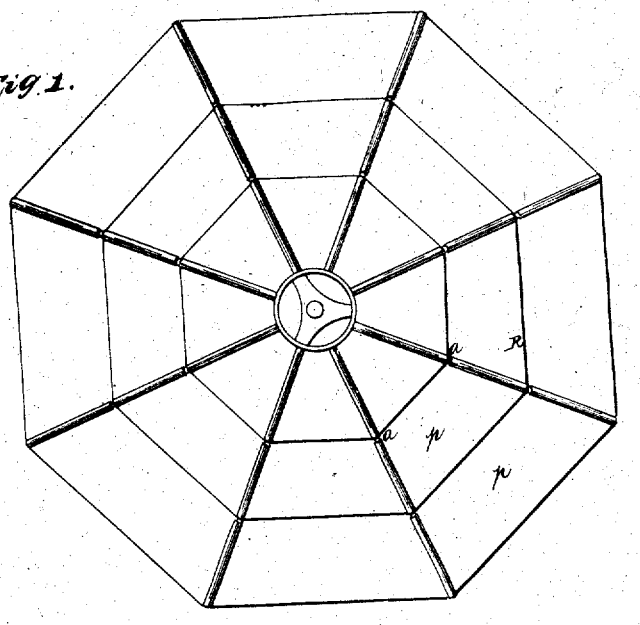
Figure 2:
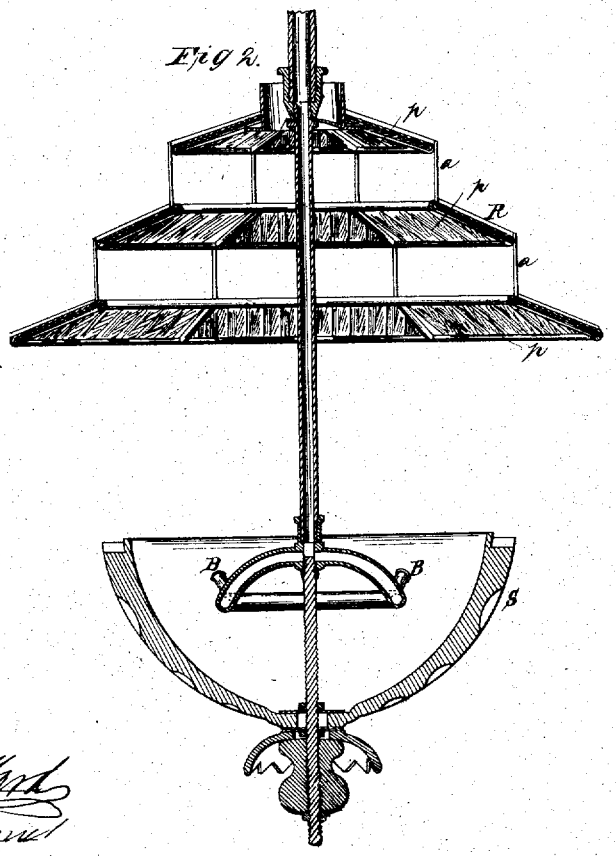

Figure 1 is a top view of reflector, and Fig. 2 is a vertical section on axis of gas-pipe.

The design of this invention is to concentrate a strong illumination upon objects beneath the light, and at the same time provide for the escape of the heated air arising from combustion. Its nature consists in forming a reflector of a series of corrugated or other suitable surfaces, so arranged that they shall rise in arch or dome form over the light, and have a suitable opening or openings for the purpose of ventilation, the construction and operation being substantially as hereinafter to be set forth.

In the drawings, the reflector R is shown of octagonal form, for suspension over a circular pipe with a number of burners, B B. The reflector is made up of a series of corrugated plates, *p*, inclined so as to rise dome-like over the light.

The reflector figured in the drawings is made up of three sections connected by stays *a*, the upper section being provided with an opening at top for ventilation, besides the spaces between the sections. The reflecting-plates can be arranged so as to give any desired form of cross-section of reflector, depending upon the arrangement of the burners over which it is to be used, so long as the dome form and ventilating devices are retained, the former giving the strong illumination below the light, and the latter feature serving to give a current through the reflector.

In forming this reflector the number of sections will be governed by the position the reflector is designed for, the arrangement figured in the drawings being but one of the many forms this character of reflector may have and retain its characteristic features of being dome-formed and ventilating.

Having described my invention and the operation thereof, I do not claim the arrangement of surface as proposed, considered as mere ventilators; but

I claim as new and of my own invention—

The arrangement of a series of reflecting-surfaces in an arch or dome form over gas-burners, so as to permit a current of air through the reflector and strongly illuminate objects below the light.

In testimony whereof I have hereunto signed my name before two subscribing witnesses.

JNO. WYBERD.

Witnesses:
JAMES HADDON,
WM. HIBBARD.